United States Patent
Suzuki et al.

(10) Patent No.: US 6,181,859 B1
(45) Date of Patent: Jan. 30, 2001

(54) COATED OPTICAL FIBER AND METHOD OF MAKING THE SAME

(75) Inventors: Atsushi Suzuki; Nobuhiro Akasaka; Yasuo Matsuda, all of Yokohama (JP)

(73) Assignee: Sumitomo Electric Industries, Ltd., Osaka (JP)

( * ) Notice: Under 35 U.S.C. 154(b), the term of this patent shall be extended for 0 days.

(21) Appl. No.: 09/341,874

(22) PCT Filed: Jan. 19, 1998

(86) PCT No.: PCT/JP98/00156

§ 371 Date: Jul. 19, 1999

§ 102(e) Date: Jul. 19, 1999

(87) PCT Pub. No.: WO98/31642

PCT Pub. Date: Jul. 23, 1998

(30) Foreign Application Priority Data

Jan. 20, 1997  (JP) ............................................. 9-007772

(51) Int. Cl.[7] ............................................... G02B 6/02
(52) U.S. Cl. .................... 385/128; 385/123; 385/145; 428/378; 522/96
(58) Field of Search ................................ 385/128, 114, 385/123, 145, 12, 143, 144, 124, 125, 126; 522/44, 96, 42, 90; 28/378, 392, 461

(56) References Cited

U.S. PATENT DOCUMENTS

| 4,962,992 | * 10/1990 | Chapin et al. | ......... 385/128 |
| 5,147,433 | 9/1992 | Petisce | ......... 65/3.11 |

FOREIGN PATENT DOCUMENTS

| 155070 | 9/1985 | (EP) . |
| 2658 | 8/1991 | (EP) . |
| 52-138946 | 11/1977 | (JP) . |
| 62-129805 | 6/1987 | (JP) . |
| 63-3155542 | 12/1988 | (JP) . |
| 03-009311 | 1/1991 | (JP) . |
| 96/31444 | 10/1996 | (WO) . |

* cited by examiner

*Primary Examiner*—Phan T. H. Palmer
(74) *Attorney, Agent, or Firm*—Pillsbury Madison & Sutro LLP

(57) ABSTRACT

A coated optical fiber comprising a drawn glass fiber, and a primary coating and a secondary coating which are formed by photo-curing primary and secondary coating resins simultaneously applied to an outer periphery of the glass fiber, wherein an adhesion force S (g/cm) at an interface between the primary coating resin after curing and the glass fiber is at least $\frac{1}{13}$ ((g/cm)/° C.) with respect to a glass transition temperature Tg (° C.) of the secondary coating resin after curing.

8 Claims, 4 Drawing Sheets

COATED OPTICAL FIBER AND METHOD OF MAKING THE SAME

TECHNICAL FIELD

The present invention relates to an optical fiber coated with two resin layers, and a method of making the same.

BACKGROUND ART

From the viewpoint of low transmission loss, silica glass fibers have been used as optical fibers for long-distance transmission. In order to maintain their transmission and mechanical characteristics in such optical fibers, a primary coating made of a relatively soft resin and a secondary coating made of a relatively hard resin are applied to the surface of the glass fiber.

Conventionally used is a coated optical fiber in which, at the same time when a glass fiber is drawn from an optical fiber preform, a primary coating resin is applied thereto and cured thereon so as to form a primary coating, and then a secondary coating resin is applied to and cured on the outer periphery of the primary coating so as to form a secondary coating. On the other hand, a recent study from the viewpoint of improving productivity is directed to a method in which both primary and secondary coating resins are simultaneously applied to the outer periphery of the glass fiber and are subsequently cured.

As such a method, for example, proposed is a method in which a plasticizer transferable between the primary and secondary coatings is added such that its transferred amount from the secondary coating to the primary coating is at least equivalent to the transferred amount in the opposite direction, thereby restraining the glass fiber and the primary coating from peeling off from each other (Japanese Patent Application Laid-Open Gazette No. Sho. 62-129805). Also proposed is a method in which the curing temperature of the primary coating resin is set higher than that of the secondary coating resin so that the primary coating resin cures before the secondary coating resin begins to cure, thereby restraining the glass fiber and the primary coating from peeling off from each other (Japanese Patent Application Laid-Open Gazette No. Sho. 63-315542).

In the former method of these conventional methods, however, the plasticizer preferentially added to the secondary coating may bleed, whereby the adhesion force at the interface between the secondary coating and coloring layer in the coated optical fiber tends to decrease. As a result, in a tape-like coated optical fiber, it becomes difficult to remove the coatings simultaneously, thus remarkably deteriorating the workability. In the latter method, on the other hand, since the resin is cured at a high temperature, its termination reaction becomes prevalent, thus increasing uncrosslinked low molecule ingredients. When its crosslinking density does not rise, its modulus of elasticity and breaking extension may decrease, whereby the function as a coating for attaining stable long-term protection tends to deteriorate.

It is an object of the present invention to provide a coated optical fiber in which primary and secondary coatings are simultaneously formed around the outer periphery of a glass fiber and in which the occurrence of of peeling can sufficiently be prevented at the interface between the primary coating resin and the glass fiber without preferentially adding a plasticizer into the secondary coating or without making the curing temperature of the primary coating resin higher than that of the secondary coating resin; and a method of making the same.

DISCLOSURE OF THE INVENTION

The coated optical fiber in accordance with the present invention is a coated optical fiber comprising a drawn glass fiber, and a primary coating (inner coating layer) and a secondary coating (outer coating layer) which are formed by photo-curing a primary coating resin (inner resin) and a secondary coating resin (outer resin) which are simultaneously applied to an outer periphery of the glass fiber, wherein an adhesion force S (g/cm) at the interface between the primary coating resin after curing and the glass fiber is at least $1/13$ ((g/cm)/° C.) with respect to a glass transition temperature Tg (° C.) of the secondary coating resin after curing.

The inventors have found that, in an optical fiber provided with primary and secondary coatings formed around the outer periphery of a glass fiber, in order to suppress peeling which occurs at the interface between the glass fiber and the primary coating, it is necessary to satisfy a relationship which will be explained in the following.

Namely, due to the heat of polymerization generated therein, usually the temperature of the coating resin is higher than the glass transition temperature thereof. When such a coating resin is cooled, it changes into a glassy state in the vicinity of the glass transition temperature as indicated in FIG. 1. As it is further cooled from the glass transition temperature to room temperature; due to the difference in coefficient of linear expansion between the primary and secondary coating resins, stress is generated in the primary coating in the direction moving away from the glass fiber. This residual thermal stress causes the primary coating to separate from the glass fiber.

In accordance with the present invention, it is necessary for the adhesion force S at the interface between the primary coating and the glass fiber to be at least $1/13$ with respect to the glass transition temperature Tg of the secondary coating resin $[(S/Tg) \geq (1/13)]$. Namely, when the glass transition temperature of the secondary coating resin is low, the adhesion force between the primary coating and the glass fiber can be relatively small; whereas, the higher is the glass transition temperature of the secondary coating resin, the greater becomes the adhesion force needed between the primary coating and the glass fiber. The inventors have found that peeling is sufficiently prevented from occurring at the interface between the primary coating and the glass fiber when the adhesion force of the primary coating with respect to the glass fiber is thus selected in response to the glass transition temperature of the secondary coating resin. Accordingly, in the coated optical fiber of the present invention, a primary coating having an adhesion force greater than the peeling force occurring at the interface between the glass fiber and the primary coating is employed, thereby sufficiently restraining the peeling from occurring.

More specifically, at the point of time when a resin in a high-temperature state being polymerized is cooled to its glass transition temperature, a glassy-state portion appears at a certain part in the resin, thus restraining its molecular chain from moving. Consequently, the lower the glass transition temperature is, the smaller becomes the change in size during the process in which the resin is cooled from the glass transition temperature to room temperature, whereby a relatively smaller adhesion force can sufficiently restrain the peeling from occurring due to the residual thermal stress. On the other hand, the higher the glass transition temperature is, the greater becomes the change in size during the process in which the resin is cooled from the glass transition temperature to room temperature, whereby a relatively greater adhesion force is necessary for sufficiently restraining the peeling from occurring due to the residual thermal stress.

The method of making a coated optical fiber in accordance with the present invention comprises:

a first step of obtaining a glass fiber by heating, melting, and drawing a glass preform;

a second step of preparing a primary coating resin and a secondary coating resin such that an adhesion force S (g/cm) at the interface between the primary coating resin after curing and the glass fiber is at least $\frac{1}{13}$ ((g/cm)/° C.) with respect to a glass transition temperature Tg (° C.) of the secondary coating resin after curing;

a third step of simultaneously applying the primary coating resin and secondary coating resin to an outer periphery of the glass fiber; and a fourth step of photo-curing the primary coating resin and secondary coating resin to yield the coated optical fiber.

In the case where primary and secondary coating resins are simultaneously applied to the outer periphery of the drawn glass fiber and then are cured, peeling stress remains in the cured primary coating in the direction moving away from the glass fiber. In accordance with the present invention, as mentioned above, the adhesion force at the interface between the glass fiber and the primary coating becomes greater than the residual thermal stress occurring there, whereby the peeling can be sufficiently restrained from occurring.

Here, "adhesion force S" refers to a force necessary for peeling a primary coating resin from a silica glass after the primary coating resin is cured so as to firmly adhere to the silica glass, and is a value determined by the following method. Namely, on a silica glass sheet soaked and washed in an aqueous sulfuric acid solution, a resin is coated such that its thickness after curing becomes 200 μm, and the resin is irradiated with ultraviolet rays with a quantity of light of 100 mJ/cm$^2$ by use of a metal halide lamp so as to be cured, thereby yielding a test strip. After thus obtained test strip is left in an atmosphere at a temperature of 25° C. and a relative humidity of 50% for 6 hours, the resin coating is pulled by 50 mm at a pulling speed of 200 mm/min so as to be peeled off in a direction at an angle of 180° with respect to the bonding surface of the silica glass plate. The adhesion force S refers to a peeling strength (g/cm) which represents the maximum pulling force at this time per unit width of the resin coating.

Further, "glass transition temperature Tg" herein refers to a value measured by the following method. Namely, a sheet-like sample which has been irradiated with ultraviolet rays with a quantity of light of 100 mJ/cm$^2$ by use of a metal halide lamp under a nitrogen atmosphere so as to be cured and which has a thickness of 0.1 mm, a width of 5 mm and a length of 22 mm is used as a measured sample. The glass transition temperature Tg of the measured sample is measured by the use of Rheovibron DDV-II-EP available from Orientec Co. under the following measuring conditions.

(Measuring conditions)

Frequency of dynamic vibration: 11 Hz

Displacement of vibration: 0.016 mm

Temperature-rising rate: 3° C./min.

In the case where a resin has a plurality of glass transition temperatures, the highest glass transition temperature is defined as the glass transition temperature Tg of this resin.

BEST MODES FOR CARRYING OUT THE INVENTION

In the following, preferred embodiments of the coated optical fiber and method of making the same in accordance with the present invention will be explained in detail with reference to the accompanying drawings.

Figure 1:
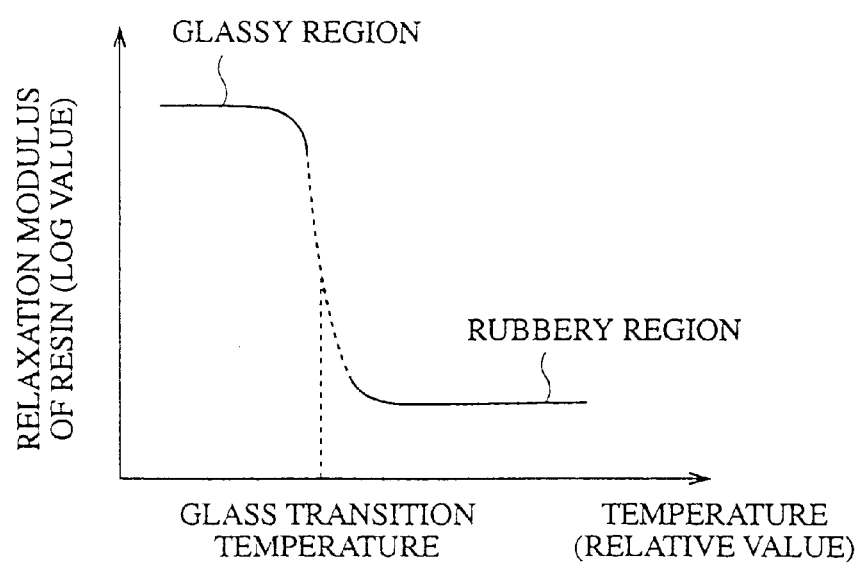
FIG. 1 is a graph schematically showing a relationship of relaxation modulus of a resin with respect to temperature thereof.
Figure 2:
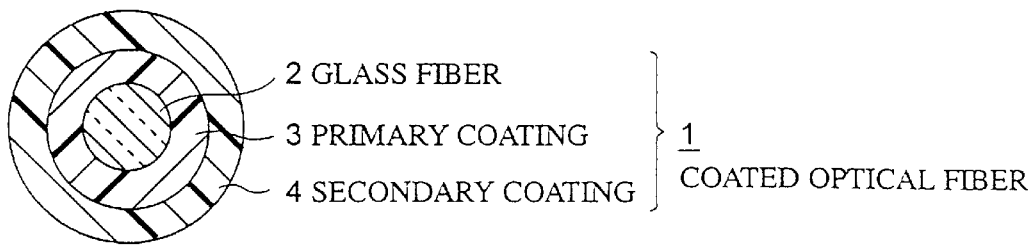
FIG. 2 is a sectional view showing an embodiment of coated optical fiber in accordance with the present invention.

FIG. 2 is a sectional view showing an embodiment of coated optical fiber in accordance with the present invention. A coated optical fiber 1 comprises a drawn silica glass fiber 2, and a primary coating (inner coating layer) 3 and a secondary coating (outer coating layer) 4 which are formed by photo-curing a relatively soft primary coating resin (inner resin) and a relatively hard secondary coating resin (outer resin) which are simultaneously applied to the outer periphery of the silica glass fiber 2.

Any resin can be used in the present invention as long as it is curable by light (ultraviolet rays). Examples thereof include acrylate based resins of radical polymerization type, polythiol/polyene based resins of photo addition polymerization type, and cation polymerization type resins utilizing a sensitizer which generates a Lewis acid when irradiated with light. Among them, the radical polymerization type resins are preferable since they have a high polymerization speed. Examples of such resins include UV-curable resins of urethane acrylate based, ester acrylate based, ether acrylate based, epoxy acrylate based, butadiene acrylate based, amino resin acrylate based, acrylic resin acrylate based, unsaturated polyester based, and silicone based. Among them, urethane acrylate based resins are preferable since they can yield a wide range of properties from relatively hard ones to relatively soft ones depending on structures of their constituent species while being tough. Though the primary coating resin and secondary coating resin may be respectively made of different kinds of resins, they are preferably made of the same kind of photo-curable resin since peeling at their interface can be prevented more securely.

In general, such a photo-curable resin contains, as its basic constituent ingredients, an oligomer (polymerizable prepolymer) including an unsaturated group (e.g., acryloyl group), a monomer (polymerizable diluent) as a reactive diluent, and a photo-polymerization initiator which absorbs photo-energy and generates active species such as radicals; and may further contain a sensitizer, a filler, a pigment, and the like.

Examples of the above-mentioned oligomer include urethane acrylate (e.g., TDI/βHPA/polyester or polyether), ester acrylate (e.g., phthalic acid/1,6-hexanediol/acrylic acid), ether acrylate, epoxy acrylate, butadiene acrylate, amino resin acrylate (e.g., melamine acrylate), acrylic resin acrylate (e.g., MMA/BA/GMA+AA), unsaturated polyester, and silicone. Such an oligomer can be made from a wide range of materials and, depending on these materials, the physical property of cured product can be designed freely, ranging from soft to hard. For example, in a urethane acrylate in which an oligo-ester (polyester polyol) having a hydroxyl terminal or an oligo-ether (polyether polyol) having a hydroxyl terminal and an acrylate having a hydroxyl group are combined with each other via diisocyanate, a wide range of products having various physical properties can be obtained according to combinations of the selected constituent chemical species (oligo-ester, oligo-ether, and the like).

Examples of the above-mentioned monomer include monofunctional monomers such as 2-ethylhexyl acrylate, ethoxydiethyleneglycol acrylate, phenoxyethyl acrylate, 2-hydroxypropyl acrylate, tetrahydrofurfuryl acrylate, and dicyclopentenyl acrylate; bifunctional monomers such as neopentylglycol diacrylate, 1,6-hexanediol diacrylate, hydroxy pivalic acid neopentylglycol diacrylate, polyethyleneglycol diacrylate, bis(acryloxyethyl) bisphenol A; and polyfunctional monomers such as trimethylolpropane triacrylate, pentaerythritol triacrylate, and dipentaerythritol hexaacrylate.

Further, examples of the above-mentioned photo-polymerization initiator include Lucirin TPO (product name, BASF), Irgacure 184 (product name, Ciba Geigy), Irgacure 651 (product name, Ciba Geigy), and Darocure 1173 (product name, Ciba Geigy).

In the photo-curable resin (100% by weight) according to the present invention (the total amount, 100% by weight, of oligomer, monomer, photo-polymerization initiator, and other additives such as a coupling agent), the content of the oligomer is preferably 20 to 90% by weight, more preferably 20 to 80% by weight, the content of the monomer is preferably 5 to 60% by weight, more preferably 10 to 45% by weight, and the content of the photo-polymerization initiator is preferably 0.2 to 10% by weight, more preferably 0.5 to 5% by weight.

In the coated optical fiber 1 of the present invention, it is necessary for the adhesion force S (g/cm) at the interface between the primary coating resin 3 after curing and the glass fiber 2 to be at least 1/13 ((g/cm)/° C.), preferably within the range of 1/13 to 1/6, with respect to the glass transition temperature Tg (° C.) of the secondary coating resin 4 after curing. It is due to the fact that, when this ratio is less than 1/13, peeling occurs at the interface between the primary coating 3 and the glass fiber 2, thus yielding a gap at this interface, whereby the long-term reliability of the coated optical fiber 1 as a transmission medium may deteriorate.

Though the adhesion force S at the interface between the primary coating resin 3 and the glass fiber 2 is mainly determined by the employed primary coating resin, it can be improved when a coupling agent, for example, is added into the primary coating resin. Examples of such a coupling resin include vinyl based silane coupling agents, mercapto based silane coupling agents, epoxy based silane coupling agents and acryl based silane coupling agents, while their content in the primary coating resin is preferably not greater than about 3% by weight and more preferably within the range of about 0.5 to about 2% by weight.

The adhesive force S is preferably within the range of about 2 to about 20 g/cm and more preferably within the range of about 5 to about 15 g/cm. When the adhesion force S is less than the lower limit, the glass transition temperature Tg required for preventing the peeling may become so low that a desired lateral pressure resistance characteristic is less likely to be obtained; whereas, above the upper limit, it tends to be harder to simultaneously remove the primary coating 3 and secondary coating 4 from the glass fiber 2.

Though the glass transition temperature Tg of the secondary coating resin 4 is mainly determined by a combination of constituent chemical species of the selected oligomer (skeleton of oligomer), it can be adjusted by the kinds and compounding amounts of monomers used as the reactive diluent. Specifically, when a polyfunctional monomer is added or increased as a monomer component, a larger number of crosslinking points can be provided, thus allowing the glass transition temperature Tg to increase.

The glass transition temperature Tg is preferably within the range of about 30 to about 250° C. and more preferably within the range of about 50 to about 150 ° C. When the glass transition temperature Tg is less than the lower limit, the resin becomes rubbery at room temperature, whereby it tends to be harder to obtain a desired lateral pressure resistance characteristic; whereas, above the upper limit, the adhesion force S required for preventing the peeling becomes so high that it tends to be harder to simultaneously remove the primary coating 3 and secondary coating 4 from the glass fiber 2.

Though not restricted in particular, the thickness (after curing) of each of the primary coating 3 and secondary coating 4 in the coated optical fiber 1 in accordance with the present invention is preferably within the range of about 10 to about 50 $\mu$m. When the glass fiber 2 having a diameter of about 125 $\mu$m is used, for example, the secondary coating 4 is typically constituted to have an outer diameter on the order of 240 to 250 $\mu$m. Also, from the viewpoint of the lateral pressure resistance characteristic of the resulting coated optical fiber, it is preferred that Young's moduli of the primary coating 3 and secondary coating 4 (after curing) be within the range of about 0.05 to about 0.15 kg/mm$^2$ and within the range of about 50 to about 150 kg/mm$^2$, respectively.

In the following, a preferred embodiment of the method of making a coated optical fiber in accordance with the present invention will be explained.

Figure 3:
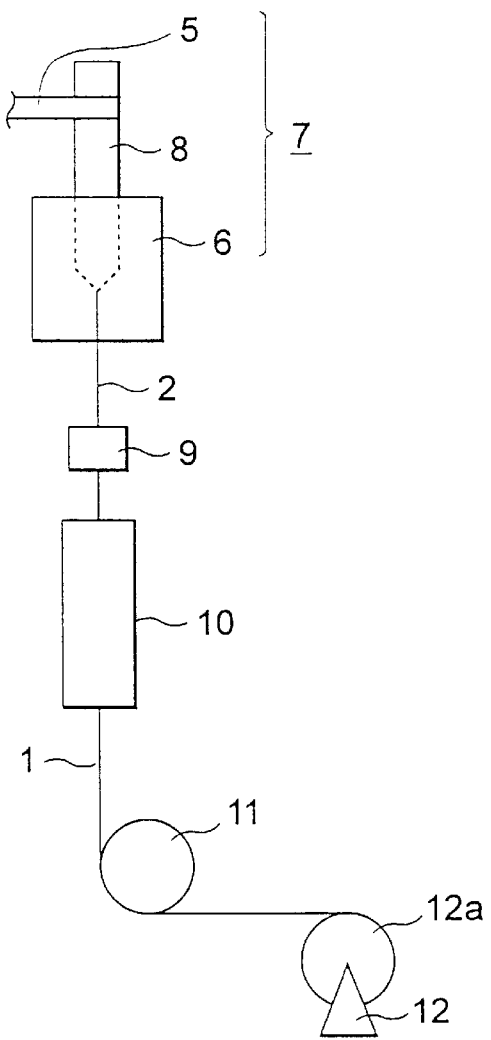
FIG. 3 is a schematic view showing an embodiment of apparatus for making the coated optical fiber in accordance with the present invention.

FIG. 3 is a schematic view showing an embodiment of apparatus for making the coated optical fiber in accordance with the present invention. Disposed in the apparatus shown in FIG. 3 is a drawing unit 7 comprising a preform feeder which is disposed so as to be vertically movable while holding an optical fiber glass preform 8, and a drawing furnace 6 for yielding a glass fiber 2 by heating, melting, and drawing the tip portion of the preform 8 introduced by the feeder 5. Successively arranged below the drawing unit 7 are a simultaneous double coating applicator (device for simultaneously coating two layers) 9 for simultaneously applying a primary coating resin 3' and a secondary coating resin 4' to the outer periphery of the glass fiber 2; a UV-curing unit 10 for forming a coated optical fiber 1 by irradiating the coated double resin layers with ultraviolet rays; a capstan 11 for pulling the coated optical fiber 1 at a constant speed; and a take-up unit 12 for winding the coated optical fiber 1 around a drum 12a.

In this apparatus, to the glass fiber 2 drawn from the preform 8 by the drawing furnace 6, the resins 3' and 41 respectively forming the primary coating 3 and secondary coating 4 are simultaneously applied by the simultaneous double coating applicator 9, and then the resins 3' and 4' are irradiated with ultraviolet rays by the UV-curing unit 10, whereby the double-coated optical fiber 1 is formed. In this process, the preform 8 is gradually fed into the drawing furnace 6 by the feeder 5.

Figure 4A:
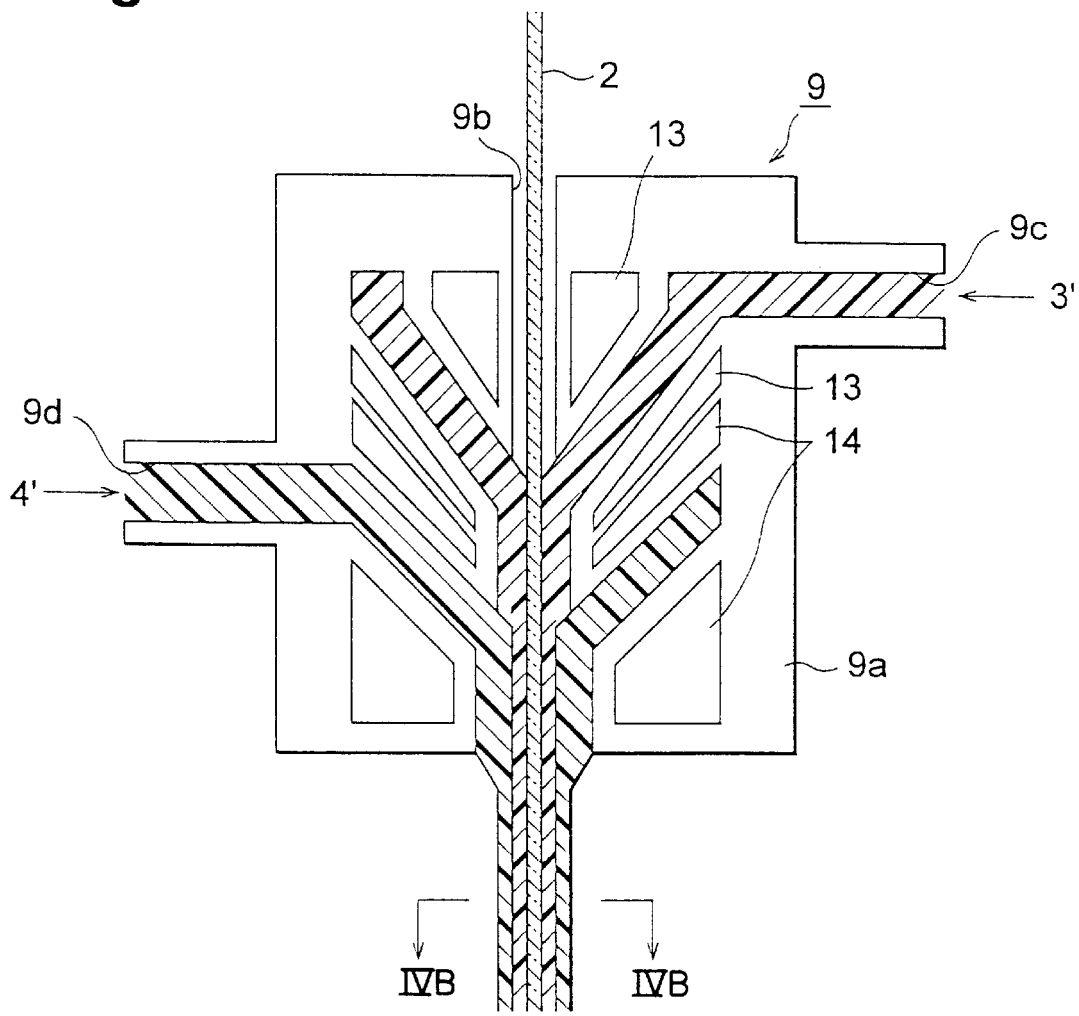
FIG. 4A is a schematic sectional view showing an embodiment of simultaneous double coating applicator suitable for making the coated optical fiber in accordance with the present invention.

FIG. 4A is a vertical sectional view showing an embodiment of the simultaneous double coating applicator 9. In the applicator shown in FIG. 4A, the center part of a cylindrical main body 9a is provided with a through-hole 9b for transmitting the glass fiber 2 therethrough, whereas passages 9c and 9d for respectively introducing the pressurized primary coating resin 3' and secondary coating resin 4' to the outer periphery of the glass fiber 2 from the outside of the main body 9a are formed independently of each other. Disposed around these passages are heaters 13 and 14 for regulating the temperatures of the primary coating resin 3' and secondary coating resin 4', respectively.

When making the coated optical fiber 1 in accordance with the present invention, the primary coating resin 3' and the secondary coating resin 4' are prepared such that the adhesion force S (g/cm) at the interface between the primary coating 3 after curing and the glass fiber 2 is at least 1/13 ((g/cm)/° C.) with respect to the glass transition temperature Tg (° C.) of the secondary coating 4 after curing; and, in the simultaneous double coating applicator 9, while their temperatures are respectively adjusted by the heaters 13 and 14, the resins are simultaneously applied to the outer periphery of the glass fiber 2. Since the primary coating resin 3' and the secondary coating resin 4' are extruded from the coating applicator 9 at their respective predetermined pressures while the glass fiber 2 is pulled at a constant speed, the thickness of the resin to be coated is determined by the amount of extruded resin and the linear velocity of glass fiber.

Figure 4B:
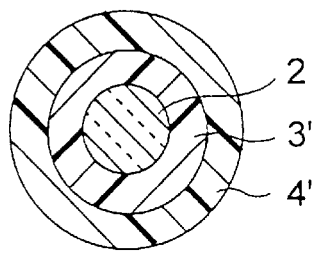
FIG. 4B is a sectional view of an uncured, coated optical fiber simultaneously coated with two resin layers by the applicator shown in FIG. 4A, taken along line IVB—IVB thereof.

The primary coating resin 3' and secondary coating resin 4' applied to the outer periphery of the glass fiber 2 as shown in FIG. 4B are irradiated with ultraviolet rays while passing through the center portion of the UV-curing unit 10, whereby curing proceeds from the secondary coating resin 4' toward the inner layer parts. The resulting coated optical fiber 1 is pulled by the capstan 11 and is wound around the drum 12a of the take-up unit 12.

In the method of the present invention, since the adhesion force S at the interface between the primary coating 3 and the glass fiber 2 is thus set to at least 1/13 with respect to the glass transition temperature Tg of the secondary coating 4, the adhesion force is maintained in a state where it is greater than the residual thermal stress occurring upon cooling from the glass transition temperature to room temperature. Consequently, in accordance with the method of the present invention, while the peeling is fully restrained from occurring at the above-mentioned interface, the coated optical fiber can be made efficiently and securely.

EXAMPLES 1 to 11 AND COMPARATIVE EXAMPLES 1 to 9

Prepared as the primary coating resin were soft urethane acrylate based photo-curable resins doped with a vinyl based silane coupling agent (manufactured by Toshiba silicone Co., Ltd., product name: TSL8311) such that the adhesion force S at the interface between the cured primary coating and the glass fiber became the values listed in Table 1; whereas prepared as the secondary coating resin were hard urethane acrylate based photo-curable resins having the values of glass transition temperature Tg listed in Table 1 after curing. Here, the adhesion force S and the glass transition temperature Tg were measured by their corresponding methods mentioned above.

Then, by means of the apparatus shown in FIG. 3, at the same time when the primary coating resin having an outer diameter of 200 $\mu$m (after curing) was applied to the outer periphery of a silica glass fiber having an outer diameter of 125 $\mu$m, its outer periphery was coated with the secondary coating resin having an outer diameter of 250 $\mu$m (after curing), and thus coated resins were irradiated with ultraviolet rays so as to be simultaneously cured, thereby yielding a coated optical fiber.

(Manufacturing Condition)

Drawing speed: 100 m/min

Light source: metal halide lamp (120 W/cm type)

In each of the coated optical fibers thus obtained, the number of peels occurring within 1 km was evaluated by observation using a microscope (50 magnification). The results thus obtained are shown in Table 1 and FIG. 5. Here, "x" indicates the cases where at least one peel was found within 1 km, whereas "O" indicates the cases where no peels were found at all within 1 km.

TABLE 1

| Example/<br>Comparative<br>Example | Coupling agent content<br>in primary coating resin<br>[wt. %] | Adhesion force at<br>primary coating/glass<br>interface S [g/cm] | Glass transition temperature<br>of secondary coating resin<br>Tg [° C.] | S/Tg | Peeling<br>(*1) |
|---|---|---|---|---|---|
| Ex. 1 | 0 | 2.5 | 30 | 0.083 | ○ |
| Comp. Ex. 1 | 0 | 2.5 | 50 | 0.05 | × |
| Comp. Ex. 2 | 0 | 2.5 | 70 | 0.036 | × |
| Ex. 2 | 0.1 | 5 | 30 | 0.17 | ○ |
| Ex. 3 | 0.1 | 5 | 50 | 0.1 | ○ |
| Comp. Ex. 3 | 0.1 | 5 | 90 | 0.056 | × |
| Comp. Ex. 4 | 0.1 | 5 | 130 | 0.038 | × |
| Ex. 4 | 0.5 | 7.5 | 70 | 0.107 | ○ |
| Ex. 5 | 0.5 | 7.5 | 90 | 0.083 | ○ |
| Comp. Ex. 5 | 0.5 | 7.5 | 130 | 0.058 | × |
| Comp. Ex. 6 | 0.5 | 7.5 | 150 | 0.05 | × |
| Ex. 6 | 1.0 | 10 | 70 | 0.14 | ○ |
| Ex. 7 | 1.0 | 10 | 90 | 0.11 | ○ |
| Ex. 8 | 1.0 | 10 | 130 | 0.077 | ○ |
| Comp. Ex. 7 | 1.0 | 10 | 150 | 0.067 | × |
| Comp. Ex. 8 | 1.0 | 10 | 190 | 0.053 | × |
| Ex. 9 | 3.0 | 15 | 90 | 0.17 | ○ |

TABLE 1-continued

| Example/<br>Comparative<br>Example | Coupling agent content<br>in primary coating resin<br>[wt. %] | Adhesion force at<br>primary coating/glass<br>interface S [g/cm] | Glass transition temperature<br>of secondary coating resin<br>Tg [° C.] | S/Tg | Peeling<br>(*1) |
|---|---|---|---|---|---|
| Ex. 10 | 3.0 | 15 | 150 | 0.1 | ○ |
| Ex. 11 | 3.0 | 15 | 190 | 0.079 | ○ |
| Comp. Ex. 9 | 3.0 | 15 | 220 | 0.068 | × |

(*1) ○: no peeling within 1 km.
×: peeling occurring within 1 km.

Figure 5:
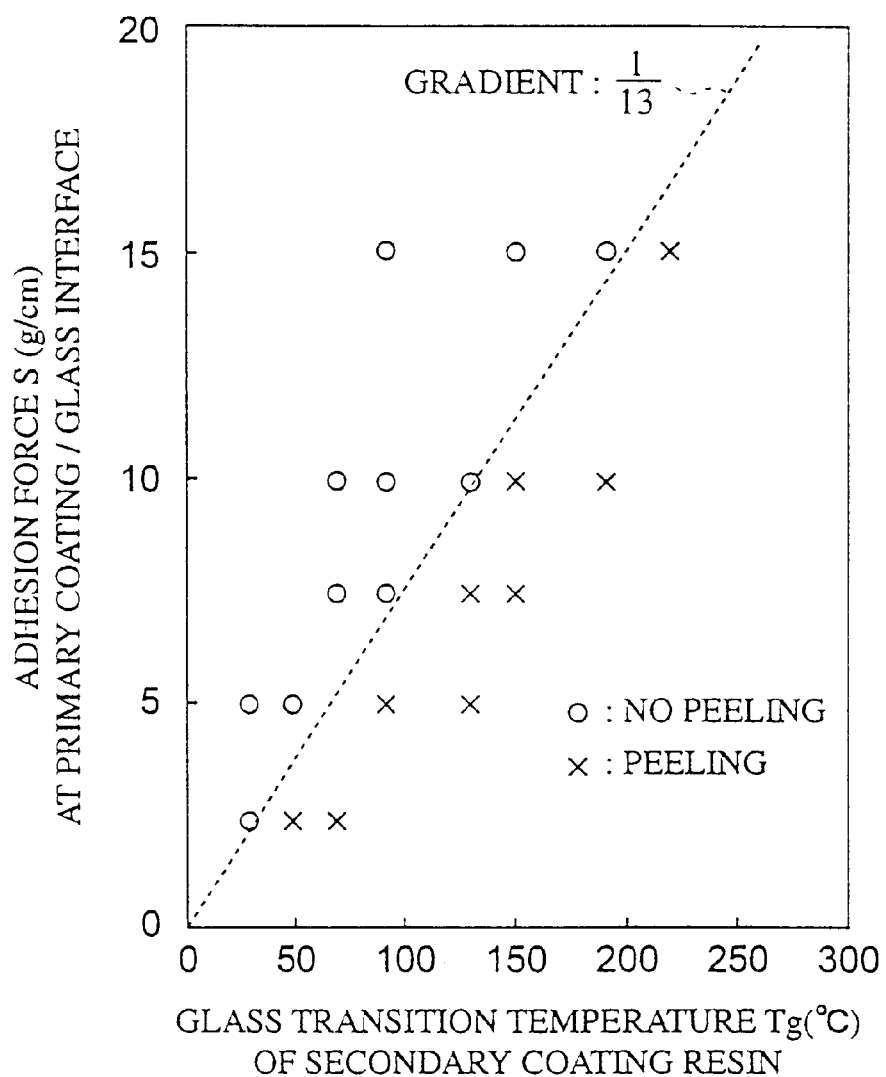
FIG. 5 is a graph showing a relationship between the glass transition temperature Tg of a secondary coating resin and the adhesion force S at a primary coating/glass interface.

As can be seen from the results shown in Table 1 and FIG. 5, when the adhesion force S (g/cm) at the interface between the primary coating and the glass fiber is at least $1/13$ with respect to the glass transition temperature Tg (° C.) of the secondary coating resin $\{(S/Tg) \geq (1/13) \ [(g/cm)/° C.]\}$, a coated optical fiber can be made without generating peeling at the interface between the primary coating and glass fiber. Namely, when this condition is satisfied, the adhesion force is maintained at a state where it is greater than the thermal stress remaining within the primary coating after the two layers of coating resins are cured and then cooled to room temperature, whereby the peeling can be sufficiently restrained from occurring therebetween.

Industrial Applicability

As explained in the foregoing, in accordance with the coated optical fiber of the present invention, without preferentially adding a plasticizer into the secondary coating, or without making the curing temperature of the primary coating resin higher than that of the secondary coating resin, peeling is sufficiently prevented from occurring at the interface between the primary coating resin and the glass fiber. Accordingly, the coated optical fiber of the present invention has a high productivity and a high reliability.

Also, in accordance with the method of the present invention, the above-mentioned coated optical fiber in accordance with the present invention can be made efficiently and securely.

What is claimed is:

1. A coated optical fiber comprising a drawn glass fiber, and a primary coating and a secondary coating which are formed by photo-curing primary and secondary coating resins simultaneously applied to an outer periphery of said glass fiber, wherein an adhesion force S (g/cm) at an interface between said primary coating resin after curing and said glass fiber is at least $1/13$ ((g/cm)/° C.) with respect to a glass transition temperature Tg (° C.) of said secondary coating resin after curing.

2. A coated optical fiber according to claim 1, wherein said adhesion force S is within a range of about 2 to about 20 (g/cm), and said glass transition temperature Tg is within a range of about 30 to about 250(° C.).

3. A coated optical fiber according to claim 1, wherein said primary coating resin and secondary coating resin after curing have Young's moduli within a range of about 0.05 to about 0.15 kg/mm$^2$ and within a range of about 50 to about 150 kg/mm$^2$, respectively.

4. A coated optical fiber according to claim 1, wherein said primary coating resin contains not more than about 3% by weight of a coupling agent.

5. A method of making the coated optical fiber according to claim 1, said method comprising:

a first step of obtaining a glass fiber by heating, melting, and drawing a glass preform;

a second step of preparing a primary coating resin and a secondary coating resin such that an adhesion force S (g/cm) at an interface between said primary coating resin after curing and said glass fiber is at least $1/13$ ((g/cm)/° C.) with respect to a glass transition temperature Tg (° C.) of said secondary coating resin after curing;

a third step of simultaneously applying said primary coating resin and secondary coating resin to an outer periphery of said glass fiber; and a fourth step of photo-curing said primary coating resin and secondary coating resin to yield said coated optical fiber.

6. A method according to claim 5, wherein said adhesion force S is within a range of about 2 to about 20 (g/cm), and said glass transition temperature Tg is within a range of about 30 to about 250(° C.).

7. A method according to claim 5, wherein said primary coating resin and secondary coating resin after curing have Young's moduli within a range of about 0.05 to about 0.15 kg/mm$^2$ and within a range of about 50 to about 150 kg/mm$^2$, respectively.

8. A method according to claim 5, wherein said primary coating resin contains not more than about 3% by weight of a coupling agent.

* * * * *